Sept. 2, 1969   A. G. PHADKE   3,465,234
AC-DC CONVERTER RESPONSIVE TO A SINGLE SIGNAL IN THE AC SYSTEM
Filed Oct. 17, 1966
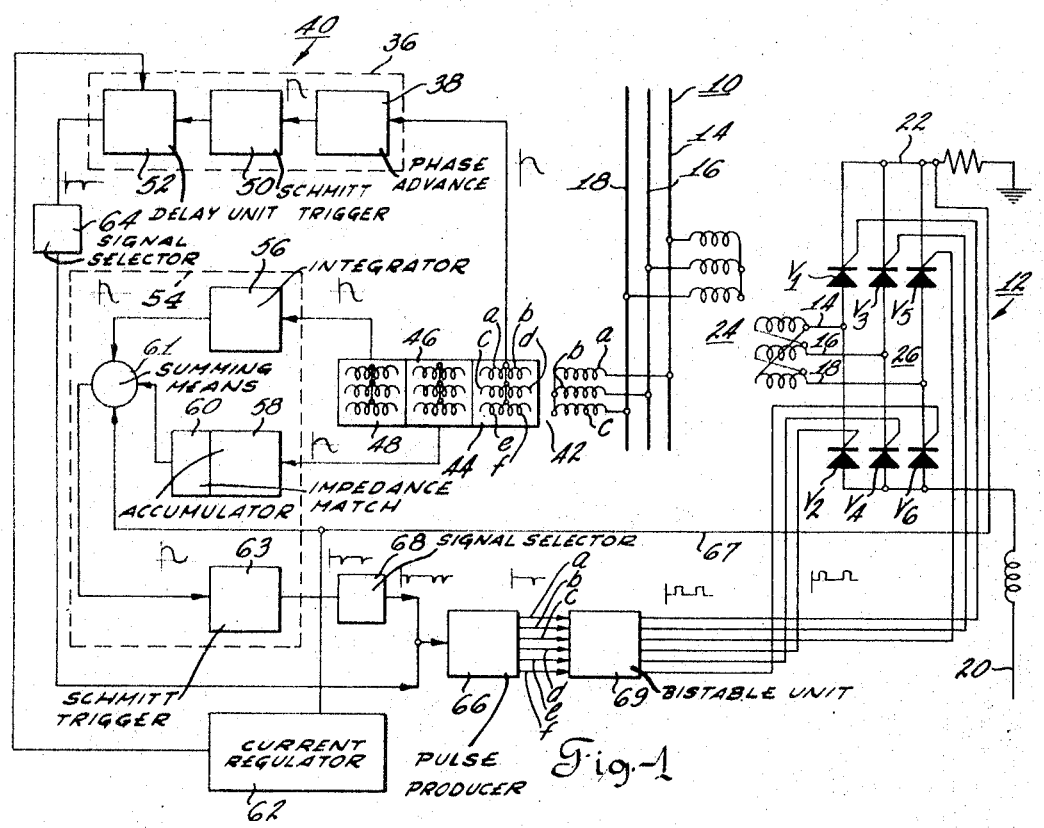
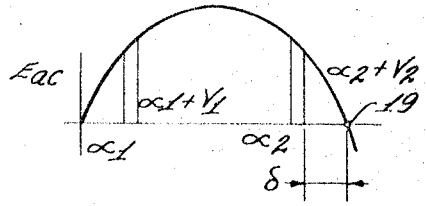
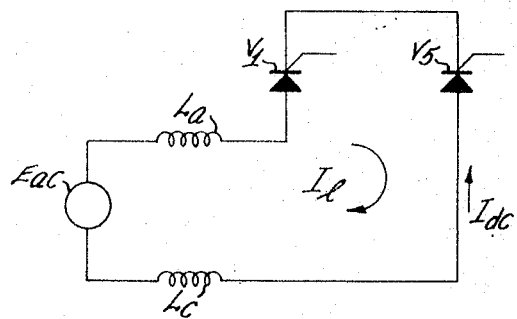
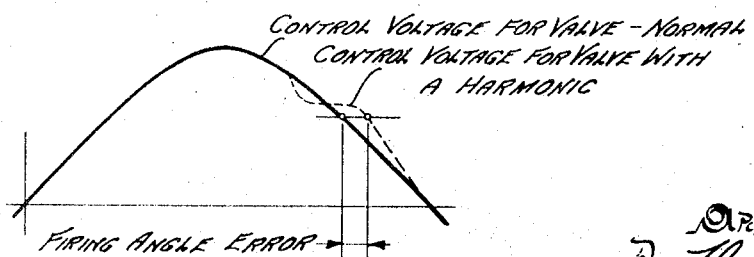

United States Patent Office 3,465,234
Patented Sept. 2, 1969

3,465,234
AC-DC CONVERTER RESPONSIVE TO A SINGLE SIGNAL IN THE AC SYSTEM
Arun G. Phadke, Madison, Wis., assignor to Allis-Chalmers Manufacturing Company, Milwaukee, Wis.
Filed Oct. 17, 1966, Ser. No. 587,332
Int. Cl. H02m 7/02
U.S. Cl. 321—5                                         4 Claims

ABSTRACT OF THE DISCLOSURE

A converter system comprises three AC conductors and two DC conductors which are interconnected by three sets of controlled rectifiers (two rectifiers in each set). The control means for firing the rectifiers in a predetermined sequence provides six symmetrical grid signals in response to the one signal in the AC system which provides the maximum margin for commutation and occurs earliest in time.

---

This invention relates generally to means for converting (rectifying or inverting) alternating/direct current. More particularly, it relates to such converting means having improved controls for regulating the firing sequence of controlled rectifiers which effect AC/DC commutation.

There are numerous instances in the electrical arts where it is necessary to convert AC/DC current. In the field of high voltage electrical power transmission, there is a trend toward rectifying AC to DC for bulk power transmission and inverting the DC back to AC for supplying loads. Some HVDC (high voltage direct current) converters employ a bank of controlled rectifiers between a multiphase AC system and a DC system which are "fired" continuously and cyclically to effect commutation. These controlled rectifiers or "valves" take the form of relatively large mercury arc tubes, thyratrons or heavy duty solid state devices which are fired (made conductive) by application of a control signal to the grid (gate thereof to permit passage of current therethrough from the anode to the cathode. The instants of commutation must be carefully governed in order to keep the converter from disrupting the 60 cycle operation of the AC system.

Formerly, the grid signals were synchronized with the AC system reference voltages so that each valve fired when the signal arrived from the particular AC line with which it was associated. Such an arrangement worked properly unless the AC system sine waves were disturbed by harmonics which caused firing angle errors in the valves. The firing angle errors in turn sustained the harmonics in the AC system. Harmonics in the AC system are undesirable because they effect power losses and, if unfiltered from the AC and DC systems, cause telephone interference.

In prior art controls for converters, a current regulator produces firing angle signals which permit the operative current in the DC system to be kept within a specified error from the current reference setting. When the system is acting as an inverter and receiving power, the instants at which commutations begin must be determined by the current regulator until the load current becomes large enough to jeopardize the safe extinction of the mercury arc in each valve. When such a value of load current is reached, a constant extinction angle computer in the control governs the instants of commutation. This latter computer utilizes the individual commutating voltages to determine the firing angle of each valve. However, assuming that the AC system has infinite short circuit capacity, the current regulator may produce sustained oscillations in the DC system if the gain and time constants of the current regulator are incompatible, as when the time constants are reduced. The remedy is to provide an adequate time constant (or constants) in the current regulator. These time constants must be matched to a given gain setting, the DC line length, the DC choke size and other variables, but the task is rather straight forward.

Furthermore, if the AC system is considered finite, the AC system voltages can in general support some harmonic voltages. If these AC system voltages (with no or partial filtering) are used as commutating voltages by the control system to determine the firing angles of the valves, any harmonic voltage in the control circuit will appear as a firing angle error in the controller. This firing angle error will in turn produce uneven sharing of the direction current by the valves. This will produce abnormal alternating current harmonics and therefore abnormal AC system voltage harmonics or different orders and sequences which can be self-sustaining. The apparent remedy for this is either to make the AC system infinite at least to the harmonics by perfect filtering, or more practically, to filter the commutating voltage signals before presenting them to the firing angle computer. In practice however, the control bus filters are not perfect and possibly, for some special AC system configurations, such a control system may sustain a specific harmonic voltage in the AC system.

Finally, the two forms of instability considered above may interact with each other and produce other types of unstable operation.

Accordingly, it is an object of the present invention to provide improved control means for effecting commutation of valves in AC/DC converters in order to eliminate the effect of harmonics which cause power losses and telephone interference problems.

Another object is to provide improved control means of the aforesaid character wherein the several valves are fired in response to a single reference voltage taken from a multiphase DC system.

Another object is to produce such control means in which a firing angle computer always produces a multiplicity of symmetrical pulses in response to the single reference voltage thereby reducing the possibility of producing sustained small oscillations.

Another object is to produce such control means wherein the firing angle for all valves is equal to the smallest of the individually computed angles in order to avoid commutation failure by insuring sufficient deionization time for all valves.

Another object is to provide such control means which keeps the fundamental frequency components of the AC currents balanced even if the AC system voltages are unbalanced thereby offering infinite negative sequence impedance to the AC system.

Another object is to provide such control means which requires a less perfect filter system for the AC system than was heretofore possible.

Other objects and advantages of the invention will hereinafter appear.

The accompanying drawing illustrates a preferred embodiment of the invention, but it is to be understood that the embodiment illustrated is susceptible of modification with respect to details thereof without departing from the scope of the appended claims.

FIG. 1 is a schematic diagram showing of an AC/DC converter incorporating the present invention;

FIG. 2 is a graph showing the principles of current commutation;

FIG. 3 is a schematic diagram of a portion of the circuit shown in FIG. 1; and

FIG. 4 is a graph showing the effect of harmonics on an AC system with finite short circuit capacity.

Referring to FIG. 1, the numerals 10 and 12 designate a multiphase AC system and a DC system, respectively, of an HVDC bulk power transmission system. The AC system 10 comprises three AC bus lines 14, 16 and 18 with finite short circuit capacity. The DC system 12 comprises at least two conductors 20 and 22, the latter being grounded.

The systems 10 and 12 are linked through suitable transformer means 24 and a converter bridge 26. Bridge 26 comprises six controlled rectifiers or valves $V_1$, $V_2$, $V_3$, $V_4$, $V_5$ and $V_6$ arranged in series connected pairs between the DC conductors 22 and 20 in the following order: $V_1$ and $V_2$, $V_3$ and $V_4$, $V_5$ and $V_6$. Conductor 14 of AC system 10 is connected between $V_1$ and $V_2$; conductor 16 between $V_3$ and $V_4$; and conductor 18 between $V_5$ and $V_6$. In practice the valves could be any suitable type of controlled rectifier having an anode, cathode and grid which begins to conduct when its anode to cathode voltage is positive and a grid signal is present. Such valves continue to conduct as long as anode to cathode voltage remains positive.

When the valves $V_1$ through $V_6$ are properly energized, AC conductors 14, 16 and 18 share in supplying current to the DC conductors 20 and 22. These currents are balanced (but not sinusoidal) when bridge 26 is excited by balanced sinusoidal voltages and balanced grid firing signals. The proper firing order of the valves for balanced operation is $V_1$, $V_6$, $V_3$, $V_2$, $V_5$, $V_4$, $V_1$ and the sequence is repeated.

During normal operation, if a smooth DC output is assumed across the DC lines 20 and 22, the alternating current in lines 14, 16 and 18 comprises harmonic current pairs based on multiples of six. These harmonic currents are normally removed by tuned filters (not shown). However, due to the finite Q-factors of the filters, there is usually some residual harmonic voltage. Other filters (not shown) are usually employed on DC system 12 to filter line voltage.

To produce a stable operating condition (i.e., so-called small oscillation stability), bridge 26 must appear to operate approximately as a constant voltage source when it is acting as an inverter. This happens if bridge 26 is operated in the "constant-extinction-angle" mode. For example, referring to FIGS. 1, 2 and 3, voltage $E_{ac}$ represents the voltage between valve $V_1$ and $V_5$ (i.e., between AC lines 14 and 16 of AC system 10), and is the commutating voltage for valve $V_1$. Before valve $V_1$ fires, current $I_{dc}$ (FIG. 3) flows through valve $V_5$. To transfer this current to valve $V_1$, voltage $E_{ac}$ must build up the loop current $I_1$ until it equals the value of current $I_{dc}$, at which time valve $V_5$ turns off and the commutation is complete. This is illustrated for two different firing angles $\alpha_1$ and $\alpha_2$ in FIGS. 2. In practice, for example, the firing angle ($\alpha_1$) must be shifted as close to the 180° point 19 in FIG. 2 as is practical. If mercury arc type valves are used, the valves must be allowed to deionize before the valves can reliably turn off. Therefore, a minimum margin angle or extinction angle $\delta$ (FIG. 2) must be maintained. Thus, depending on the load current, the firing angle ($\alpha_1$) must be adjusted to keep a fixed extinction angle $\delta$. If thyristors are used as valves, the angle $\delta$ can be made very small because of the absence of any significant "deionization" time.

Referring to FIG. 1, there is shown a control 40 for bridge 26 in accordance with the present invention. In this control, the control signals for the grids of valves $V_1$ through $V_6$ are derived from a single sine wave obtained from the AC system 10 and take the form of six symmetrically timed pulses which are produced from the sine wave. Control 40 comprises a control transformer 42 having primary windings 42a, 42b and 42c, respectively, which are connected to the conductors 14, 16 and 18 of AC system 10 and serve as the means for obtaining sine wave signals from the AC system. The primary windings of transformer 42 are coupled to three sets of secondary windings 44, 46 and 48 which serve as signal processing means. Each set of windings 44, 46 and 48 comprises six sections, such as the sections 44a through 44f of set 44.

It is to be understood that control 40 is adapted to control either the rectification or inversion of AC/DC power, depending on whether the DC system 12 is transmitting or receiving power at the end with which the control 40 is associated. Accordingly, control 40 is provided with a power transmission section 36 comprising, for example, phase advance means 38, Schmitt trigger means 50 and a delay unit 52. Control 40 is also provided with a power receiving section 54 comprising, for example, integrator means 56, accumulator means 58 and impedance matching means 60. Control 40 is further provided with current regulating means 62 and with a firing angle computer and pulse producing means 66. Pulse producing means 66 is connected to a bistable unit 69 which provides grid pulses of proper duration in response to pulses from means 66. Bistable unit 69 turns on the proper grid signal and turns it off when the next signal starts in order to protect against accidental valve turn off.

Means including a circuit 67 is connected between conductor 22 of DC system 12 and between power receiving section 54 and current regulating means 62. Circuit 67 carries a DC current signal for computing constant current pulses and constant extinction angle pulses. When power is being transmitted, the DC current signal in circuit 67 is compared with a reference setting in current regulating means 62 and the error signal obtained is amplified and sent to delay unit 52 in power transmission section 36. If the DC current signal has shifted from the reference setting, delay unit 52 brings it back. If the current carried by DC system 12 is large, there is need for a larger extinction angle. Accordingly, the DC current signal in circuit 67 is processed by current regulating means 62 to accomplish this.

As will be understood in connection with power transmitting section 36, delay unit 52 is adapted to shift the pulse it receives from Schmitt trigger means 50 in accordance with the current regulating signal from circuit 67 so that the pulse is corrected for any minimum nonzero point delay. The pulse from Schmitt trigger means 50 is based on the sine wave received from the phase advance means 38. Phase advance means 38 is to insure that the output from delay unit 52 corresponds to the zero point of the sine wave entering section 36.

As will be understood in connection with power receiving section 54, accumulator means 58 and impedance matching means 60 provide a voltage signal which is proportional to the peak of the sine wave received from the sets of windings 46 of transformer 42. The integrator 56 integrates the same sine wave, and after the signals are added by the summing means 61, the resultant signal is transmitted to a Schmitt trigger means 63 which produces an output signal to time discriminator 66. Note that time discriminator 66 is adapted to determine whether power is being transmitted or received by control 40.

In accordance with the present invention, signal selecting means 64 is connected in circuit between delay unit 52 and means 66 of control 40. When power is being transmitted, signal selecting means 64 is adapted to sample the six signals appearing on the windings 44a through 44f of secondary winding 44 of transformer 42 and to select one. As a practical matter, in the power transmitting mode, any one of the six signals could be selected. The six signals from secondary winding 44, including the one signal which will ultimately be selected are fed to power transmission sections 36 for processing and shaping and the one signal selected by means 64 is then transmitted to a firing angle computer and pulse producing means 66 which provides six symmetrical grid signals equally spaced in a predetermined time sequence. Pulse producing means 66 is connected to bistable unit 69. Pulse producing means 66 has six output terminals 66a through 66f which are connected through bistable unit 69 to the grids of the valves $V_1$ through $V_6$, respectively, to transmit the six grid signals.

In accordance with another aspect of the present invention, signal selecting means 68 is connected in circuit between power receiving section 54 and means 66 of control 40. When power is being received, signal selecting means 68 is adapted to sample the six signals appearing on the windings 46 and 48 of transformer 42 and to select the one which provides the maximum margin for commutation, i.e., that signal which occurs earliest in time and has the smallest firing angle. The signals from secondary windings 46 and 48, including the one signal which will ultimately be selected are fed to power receiving section 54 for processing and shaping and the one signal selected by means 68 is then transmitted to a firing angle computer and pulse producing means 66 and through bistable unit 69 to provide six symmetrical grid signals equally spaced in a predetermined time sequence for operation of the valves as hereinbefore described.

As will be understood, the invention disclosed herein is not necessarily limited to use with multiphase AC systems, but could be employed with a single phase AC system. Furthermore, depending on the level of current being handled by the DC system, several bridges could be employed and connected in series with each other across the two conductor DC system.

The embodiments of the invention in which an exclusive property or privilege is claimed are defined as follows:

1. In a system for converting AC/DC electrical power,
an AC system,
a DC system,
means including a plurality of controlled rectifiers linking said AC and DC systems,
and control means for sampling a plurality of signals in said AC system, any one of which signals can occur earliest in time, for selecting the one signal which occurs earliest in time and for providing a plurality of symmetrical signals based on said one signal to effect firing of all of said rectifiers in a predetermined sequence.

2. In a system for converting AC/DC electrical power,
an AC system comprising three conductors,
a two conductor DC system,
three sets of controlled rectifiers connected between said two conductors of said DC system,
each said set comprising a pair of series connected controlled rectifiers,
each of said three conductors in said AC system being connected between said pair of controlled rectifiers in one set,
and control means for firing said rectifiers in a predetermined sequence,
said control means comprising first means for providing six signals based on conditions in said AC system,
second means for selecting one of said six signals,
and third means for providing six symmetrical grid signals in response to said one signal to effect firing of said rectifiers.

3. A system according to claim 2 wherein said one signal is the one which provides the maximum margin for commutation.

4. A system according to claim 3 wherein said one signal is that one of the six which occurs earliest in time.

References Cited

UNITED STATES PATENTS

| | | | |
|---|---|---|---|
| 3,114,098 | 12/1963 | Rallo et al. | 321—18 |
| 3,134,068 | 5/1964 | Feltman | 321—5 XR |
| 3,273,043 | 9/1966 | Clarke et al. | 321—18 |
| 3,329,883 | 7/1967 | Frierdich | 321—47 XR |
| 3,343,063 | 9/1967 | Keeney et al. | 321—5 |
| 3,351,838 | 11/1967 | Hunter | 321—5 |
| 3,360,709 | 12/1967 | Etter | 321—5 |

LEE T. HIX, Primary Examiner

W. M. SHOOP, JR., Assistant Examiner

U.S. Cl. X.R.

321—18